United States Patent
Mariani et al.

(10) Patent No.: US 9,150,055 B2
(45) Date of Patent: Oct. 6, 2015

(54) MOTORCYCLE TYRE

(75) Inventors: Mario Mariani, Milan (IT); Davide Dall'Abaco, Milan (IT); Roberto Marangon, Milan (IT)

(73) Assignee: Pirelli Tyre S.p.A., Milan (IT)

(*) Notice: Subject to any disclaimer, the term of this patent is extended or adjusted under 35 U.S.C. 154(b) by 1428 days.

(21) Appl. No.: 12/741,452

(22) PCT Filed: Nov. 6, 2007

(86) PCT No.: PCT/IT2007/000780
§ 371 (c)(1),
(2), (4) Date: Jul. 21, 2010

(87) PCT Pub. No.: WO2009/060481
PCT Pub. Date: May 14, 2009

(65) Prior Publication Data
US 2010/0282390 A1 Nov. 11, 2010

(51) Int. Cl.
*B60C 11/03* (2006.01)

(52) U.S. Cl.
CPC ........... *B60C 11/0302* (2013.04); *B60C 11/033* (2013.04); *B60C 11/0311* (2013.04); *B60C 11/0332* (2013.04); *B60C 2011/0374* (2013.04); *B60C 2200/10* (2013.04)

(58) Field of Classification Search
CPC .................. B60C 11/0302; B60C 2011/0374; B60C 11/033
USPC ....................... 152/209.11, 209.17
See application file for complete search history.

(56) References Cited

U.S. PATENT DOCUMENTS

| D326,631 S | * | 6/1992 | Buck et al. ............... D12/535 |
| D337,078 S | * | 7/1993 | Pannain ................... D12/535 |
| 6,200,401 B1 | * | 3/2001 | Watkins et al. ......... 152/209.11 |
| 6,220,320 B1 | * | 4/2001 | Nakagawa et al. ...... 152/209.11 |
| 2006/0000534 A1 | | 1/2006 | Matsunaga |
| 2006/0219342 A1 | | 10/2006 | Steinbach |

FOREIGN PATENT DOCUMENTS

| EP | 1 612 058 A1 | | 1/2006 |
| JP | 03-273909 A | * | 12/1991 |
| JP | 05-201207 A | * | 8/1993 |
| JP | 07-228107 A | * | 8/1995 |
| JP | 63-116907 A | * | 5/1998 |
| JP | 2001-030719 A | * | 2/2001 |

(Continued)

OTHER PUBLICATIONS

Machine translation for Japan 2001-030719 (no date).*

(Continued)

*Primary Examiner* — Steven D Maki
(74) *Attorney, Agent, or Firm* — Finnegan, Henderson, Farabow, Garrett & Dunner, L.L.P.

(57) ABSTRACT

A tire for motorcycles includes a tread band in which a tread pattern is formed which includes a series of transverse grooves disposed at least laterally of the equatorial plane. The tread pattern on the whole defines a low sea/land ratio on the tread band. The series of transverse grooves includes a plurality of main recesses having an overall length at least equal to one fourth of a lateral extension of the tread band. The main recesses define with the equatorial plane, an angle less than or equal to 65°, substantially over the entire length thereof.

15 Claims, 7 Drawing Sheets

(56) References Cited

FOREIGN PATENT DOCUMENTS

| WO | WO 00/38906 | 7/2000 |
| WO | WO 2005/005169 A1 | 1/2005 |

OTHER PUBLICATIONS

Machine translation for Japan 07-228107 (no date).*

Machine translation for Japan 05-201207 (no date).*

International Search Report from the European Patent Office for International Application No. PCT/IT2007/000780, mailed Jul. 29, 2008.

Kajimoto, K., "Pneumatic Tire for Motorcycle," Patent Abstract of Japan, Publication No. JP 05-201207, Publication date Aug. 10, 1993.

* cited by examiner

MOTORCYCLE TYRE

CROSS REFERENCE TO RELATED APPLICATION

This application is a national phase application based on PCT/IT2007/000780, filed Nov. 6, 2007, the content of which is incorporated herein by reference.

FIELD OF THE INVENTION

The present invention relates to tyres for motorcycles. In particular, the invention relates to tyres designed to be mounted on the front wheel and/or rear wheel of motorcycles of high engine displacement (1000 cm$^3$ or higher, for example), and/or high-powered motorcycles (170-180 HP or higher, for example).

BACKGROUND ART

FIGS. 1a and 1b show the side extension of a tread portion of a known tyre from the Applicant, marketed under the trademark Diablo™, suitable for road or sports use on high-powered motorcycles. In particular, FIG. 1a shows the tread pattern of a Diablo™ tyre suitable for fitting on a rear wheel of a motorcycle, while FIG. 1b shows the tread pattern of a Diablo™ tyre suitable for fitting on a front wheel of a motorcycle.

With reference to FIGS. 1a and 1b, the tread has groups of transverse grooves 111 disposed laterally of the equatorial plane of the tyre, each group repeating itself consecutively one after the other along the circumferential tyre extension. In the pattern of the front tyre, shown in FIG. 1b, a longitudinal groove 112 extends with a zigzag course in the central region of the tread, astride the equatorial plane, and connects the groups of transverse grooves 111.

The pattern shown in FIGS. 1a and 1b is formed in the tread of a radial-carcass tyre on which a belt structure is superposed which comprises at least one layer of cords disposed substantially along a circumferential direction.

The Diablo™ tyre is greatly appreciated by motorcyclists due to its optimal features of easy drive, grip, handling and stability also at high speeds. In particular, the tyre tread pattern co-operates in obtaining a suitable contact surface in the different drive conditions (on a straight line and/or on a bend), as well as a suitable draining of the water when the tyre is run on the wet asphalt.

SUMMARY OF THE INVENTION

In recent times there has been a tendency to introduce, on the market, motorcycles for road use having increasingly higher power and/or engine displacement. In fact, for example there are already on the market motorcycles of 1000 cm$^3$ engine displacement, with powers of 180 HP, for road use. The performance characteristics of these motorcycles approach those of motorcycles exclusively intended for sports uses.

In order to maintain these high performance characteristics, the tyres fitted on the wheels of these motorcycles must have excellent qualities of grip to the ground so that the high torque can be efficiently discharged to the ground both during running on a straight line and during accelerations at the end of a bend, and in addition an efficient braking action is ensured. Grip becomes a really critical point when the tyre is rolling on a wet road surface.

To make the motorcyclist sure that these performance characteristics are reached in full safety, tyres must ensure, in addition to an optimal grip to the ground, a steady behaviour both during running on a straight line and (or above all) during running on a bend, and in particular under conditions of strong acceleration. In fact a steady behaviour of the tyre is an indication of its aptitude to efficiently dampen the perturbations transmitted by the unevenness of the roadway on running, so that these perturbations are not propagated towards the motorcycle, thus impairing the drive stability of same.

Use of softer compounds in the tread band, i.e. compounds capable of better adapt themselves to the profile given by the unevennesses of the road surface and/or penetrating into these unevennesses, characterised by a lower modulus of elasticity and/or high hysteresis, would enable the grip requirements to be met in tyres adapted to be fitted on motorcycles having such high powers. From tests carried out with the above described Diablo™ tyres, the Applicant has however noticed that use of these compounds can impair the stability behaviour of the tyres, in particular of the rear tyre, under critical use conditions, such as strong accelerations/decelerations on exiting/negotiating a bend for example, or on getting over bends at high speed. The Applicant has further noticed early initiation of uneven wear phenomena at the edge of the grooves, with a consequent further reduction in the stability behaviour.

The Applicant has thus tackled the problem of providing tyres for motorcycles capable of ensuring, even in case of use of soft compounds, adequate features of stability behaviour and wear evenness, substantially under any drive condition of the motorcycle, in particular under critical conditions such as strong accelerations/decelerations on exiting/negotiating a bend, or on getting over bends at high speed when the tyre is rolled both on a dry road surface and on a wet road surface.

The Applicant has found that this problem can be solved by use of a tread pattern with very spaced apart recesses and particularly inclined relative to a circumferential direction, preferably together with a marked curvature of the tyre profile. The Applicant thinks that the presence of more spaced apart recesses counteracts the compound mobility in the tread band, providing a stabilising effect relative to the perturbations arising during running on a wet road surface, and resistance to wear of said tread band. In addition, the Applicant has observed that a stronger inclination of the recesses in the tread pattern allows at least one portion of the recess to be maintained inside the contact region between tyre and ground, in spite of use of more spaced apart recesses, so as to ensure an efficient water draining in case of drive on a wet road surface.

In a first aspect, the invention relates to a tyre for motorcycles comprising a tread band having a central region and two shoulder regions. The central region extends symmetrically astride the equatorial plane of the tyre over a width smaller than or equal to 60% of the lateral extension of the tread band. Formed in the tread band is a tread pattern comprising a series of transverse grooves disposed at least laterally of said equatorial plane, so that:
  the tread pattern on the whole defines a sea/land ratio lower than 14%;
  the series of transverse grooves comprises a plurality of main recesses having an overall length equal to at least one fourth of a lateral extension of said tread band;
  said main recesses define with said equatorial plane an angle smaller than or equal to 65°, substantially over the whole length thereof.

For the purposes of the present invention, with reference to the main recesses of the tread pattern, the expression "substantially over the whole length thereof" means over the whole length of the main recesses except possible portions of non-significant length, such as a length smaller than or equal to one eighth of the lateral extension of the tread band.

In addition, for the purposes of the present invention, by "tread pattern" it is intended the representation of all the points of the tread band (inclusive of recesses and/or grooves) in a plane perpendicular to the equatorial plane of the tyre and tangent to the maximum diameter of the tyre. In the representation:

- in lateral direction the distance of each point of the tread band from the equatorial plane corresponds to the distance of this point from the equatorial plane measured on the lateral extension of the band itself;
- in circumferential direction the distance between any two points of the tread band corresponds to the distance between the projections of the two points on the circumference corresponding to the maximum diameter of the tyre, which projection is carried out by means of radial planes passing through the two points.

The measurements of angles, and/or linear quantities (distances, widths, lengths, etc.) and/or surfaces are to be intended as referred to the tread pattern as above defined.

In addition, with reference to the angle arrangement of the grooves and/or the recesses formed in the tread band relative to the equatorial plane of the tyre, this angle arrangement is to be intended for each point of the groove and/or recess as referred to the angle (included between 0° and 180°) formed by a rotation carried out starting from the equatorial plane until the direction tangent to the groove and/or recess passing through this point. In case of tyre adapted to be fitted on a front wheel of a motorcycle, the rotation is to be intended as being carried out by a vector initially lying in the direction defined in the tread pattern by the equatorial plane and oriented in the same way as the predetermined rotation direction of the tyre (see FIG. 4). In case of tyre adapted to be fitted on a rear wheel of a motorcycle, the rotation is to be intended as being carried out by a vector initially lying in the direction defined, in the tread pattern, by the equatorial plane and oriented in the way opposite to the predetermined rotation direction of the tyre (see FIG. 3).

In addition, for the purposes of the present invention, the following definitions apply:

- By "tyre for motorcycles" it is intended a tyre having a high curvature ratio (typically greater than 0.200), capable of reaching high camber angles when the motorcycle is running on a bend.
- By "camber angle" it is intended the angle between the equatorial plane of the tyre fitted on the motorcycle's wheel and a plane orthogonal to the road surface.
- By "equatorial plane" of the tyre it is intended a plane perpendicular to the rotation axis of the tyre and dividing the tyre into two symmetrically identical parts.
- By "circumferential" direction it is intended a direction generally oriented in the rotation direction of the tyre or in any case of little inclination relative to the rotation direction of the tyre.
- By "transverse" direction it is intended a direction generally perpendicular to or in any case substantially inclined relative to the rotation direction of the tyre.
- By "sea/land ratio" it is intended the ratio between the overall surface of the recesses of a given portion of the tyre tread pattern (possibly of the whole tread pattern) and the overall surface of the given portion of the tread pattern (possibly of the whole tread pattern).
- By "lateral extension" of the tread band it is intended the length of the arc defining the radially outermost profile of the tread band in a cross section of the tyre.
- By "curvature ratio" of the tyre it is intended the ratio of the distance included between the radially highest point of the tread band and the maximum chord of the tyre, to the maximum tyre chord itself, in a cross section of the tyre.
- By "average width" of a groove it is intended the ratio between the groove surface and groove length.

The present invention in one or more of its preferred aspects can comprise one or more of the features hereinafter set out.

The main recesses can define an angle smaller than or equal to 45° with the equatorial plane, in at least one portion of the central region of said tread band. Conveniently, selection of a smaller angle for the central region of the tread band enables the impact frequency of the recess edges on the ground to be reduced during rolling of the tyre at high speed on a straight line or on bends with high radius of curvature, with a consequent increase of the stability behaviour of the tyre and improvement in the resistance to wear.

Conveniently, the transverse profile of said tread band can have a curvature ratio greater than or equal to 0.300. With these curvature values, the Applicant has noticed an important improvement in the tyre behaviour on a bend, particularly when the tyre is to be fitted on the rear wheel of the motorcycle, and more particularly on getting over bends at high speed at the maximum camber angle tolerated by the tyre-motorcycle assembly, and/or in full acceleration on leaving a bend. The Applicant believes that this improvement depends on an increase in the surface of the contact region between tyre and ground.

The sea/land ratio can be advantageously made higher in the central region as compared with the shoulder regions of the tread band. The Applicant has noticed that this choice enables a more efficient water draining to be obtained in case of drive conditions on a wet road surface. Under drive conditions on a wet road surface, in fact, maintenance of a drive safety margin does not allow the conditions of maximum camber to be reached, so that it is possible to provide a greater number of recesses in the central region than in the shoulder regions of the tread, while at the same time maintaining a low overall solid/hollow ratio. Due to the above, an optimal grip to the ground (resistance to the aquaplane phenomenon) on a wet road surface can be always obtained also under high-speed drive conditions.

The tread band with the above mentioned features can be advantageously coupled with a radial carcass structure, comprising at least one layer of elastomeric material having reinforcing elements substantially disposed at right angles to a circumferential direction (i.e. with angles between 65° and 115° relative to the circumferential direction).

A belt structure comprising at least one layer of elastomeric material having reinforcing elements disposed substantially in a circumferential direction (i.e. with an angle included between 0° and 5° in absolute value relative to the circumferential direction) is advantageously disposed between said carcass structure and tread band.

A tyre structure having a radial carcass and a so-called "zero-degree" belt, in particular manufactured using reinforcing cords made of steel, has a very stable and stiff behaviour when the tyre is rolling on a straight line at the maximum speed, and a soft behaviour when the tyre is rolling on a bend, when the travel speeds are less high, so as to give great drive stability to the motorcycle under all running conditions. In addition, this structure fits well with a tread pattern comprising recesses disposed in an inclined direction relative to the equatorial plane of the tyre, because the direction of the recesses crosses the direction of the reinforcing elements of the zero-degree belt, so as to counteract possible forces tending to close the recesses upon themselves, which will give rise to a reduction in the draining effect in case of drive on a wet road surface. It is therefore convenient that the inclination at least of the main recesses of the tread pattern should not be reduced to a value lower than some degrees (5° for example).

To prevent the number of grooves of the tread pattern from being reduced too much, thus reducing safety when the tyre is run on a wet road surface, the tread pattern conveniently defines a sea/land ratio exceeding 4% on the tread band.

In a preferred embodiment, the transverse grooves are formed by a broken line comprising mutually-connected rectilinear stretches.

The tread pattern may further comprise a series of circumferential grooves. These circumferential grooves form an angle of at least 135° with said equatorial plane (conveniently this angle can be maintained below 175°).

In a particularly preferred embodiment, the series of transverse grooves comprises a first group of transverse grooves, in which pairs of transverse grooves are mutually connected by one of the circumferential grooves, and a second group of isolated transverse grooves.

The grooves of the first and second groups of transverse grooves can conveniently be alternated with each other in the tread pattern.

For a tyre suitable for being fitted on a rear wheel of a motorcycle (in particular for the Supersport market segment), it may be convenient to provide a tread pattern altogether defining a sea/land ratio lower than 10% on the tread band.

On the rear tyre, at least one axially external portion of said shoulder regions can have a sea/land ratio equal to zero. The Applicant has noticed that this choice enables the contact surface on a bend to be greatly improved on a dry road surface when the tyre is run at the maximum camber angle (or in any case with very high camber angles) thus obtaining more grip, stability and acceleration ability when the motorcycle leaves the bend itself. In addition, the Applicant has observed that this choice does not represent a danger when the tyre is run on a wet road surface, because these running conditions do not allow high camber angles to be reached on a bend.

Preferably, in the rear tyre the main recesses have an average width smaller than or equal to about 6 mm. The Applicant has noticed that this choice allows the stability behaviour of the tread band to be further improved also when particularly soft compounds are used.

In addition, in the rear tyre some transverse grooves can conveniently intersect the equatorial plane of the tyre.

On the other hand, for a tyre suitable for being fitted on a front wheel of a motorcycle, provision of a tread pattern that on the whole defines a sea/land ratio higher than 10% on the tread band may be convenient.

Preferably, in the front tyre the main recesses have an average width smaller than or equal to about 5 mm.

In addition, in the front tyre at least one portion of the central region placed at the equatorial plane may be provided to have a sea/land ratio equal to zero. This closed ring of the tread band constitutes a region of greater stiffness above all to shearing stresses, advantageously enabling the motorcycle's drive stability to be improved when the tyre is running on a straight line at the highest speed.

In a further aspect, the present invention relates to a motorcycle comprising a front wheel and a rear wheel, wherein on at least one of said front and rear wheels a tyre as above described is fitted. In particular, use of a higher sea/land ratio in the tread band of the tyre fitted on the front wheel than the sea/land ratio in the tread band of the tyre fitted on the rear wheel allows an optimal grip to be ensured when the tyre is run on a wet road surface.

BRIEF DESCRIPTION OF THE DRAWINGS

Further features and advantages of the present invention will be highlighted by the following detailed description of some embodiments thereof, given by way of non-limiting example, with reference to the accompanying drawings, in which.

DETAILED DESCRIPTION OF EMBODIMENTS OF THE INVENTION

Figure 2:
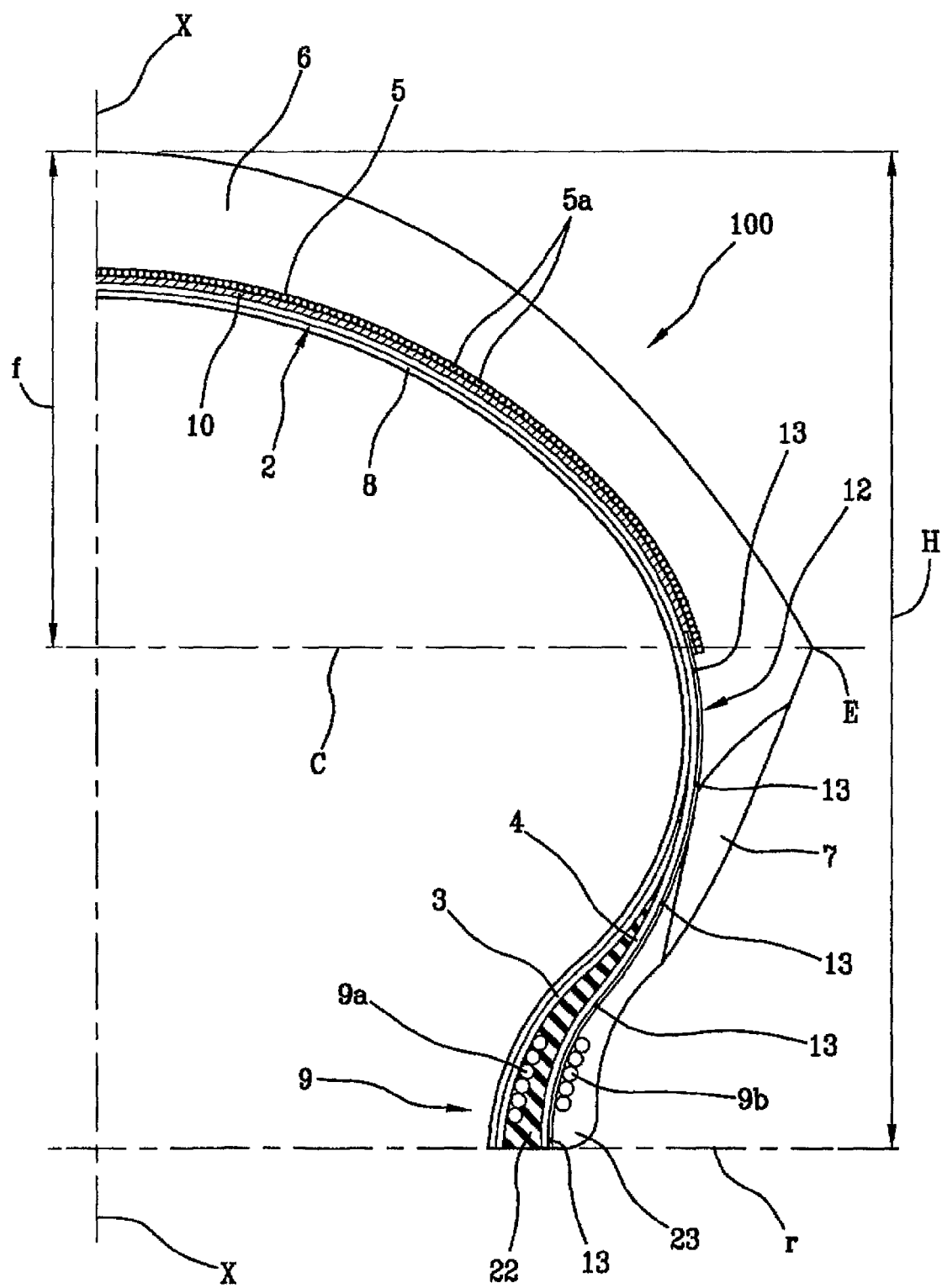
FIG. 2 diagrammatically shows a half-section perpendicular to the equatorial plane of a tyre for motorcycles.

With reference to FIG. 2, a tyre for motorcycles has been generally identified with reference numeral 100 and it comprises a carcass structure formed with at least one carcass ply 2. The carcass ply 2 is shaped into a substantially toroidal configuration and is in engagement through its opposite circumferential edges, with at least one annular reinforcing structure 9, so as to form a structure usually identified as "bead".

In the preferred embodiment shown in FIG. 2 the carcass ply 2 is formed with two half-plies 3, 4. This carcass ply 2 can be built following the process disclosed in document WO 00/38906. The term "half-ply" herein and in the following means a structure of a substantially toroidal extension formed with a plurality of strip-like elements of elastomeric material comprising reinforcing elements, placed to a mutual distance substantially corresponding to the transverse size of the strip-like element itself.

The reinforcing elements included in the carcass ply 2 preferably comprise textile cords selected from those usually adopted in building carcasses for tyres, such as nylon, rayon, PET, PEN, with an elementary thread of a diameter included between 0.35 mm and 1.5 mm.

In the embodiment shown in FIG. 2, the annular reinforcing structure 9 has at least one annular insert obtained by a preferably metallic thread element at least partly coated with elastomeric material disposed in substantially concentric coils, each coil being defined by a continuous spiral length or by concentric loops formed from respective thread elements.

Preferably, as shown in FIG. 2, two annular inserts 9a and 9b are provided, as well as a filler 22 of elastomeric material at an axially external position to the first annular insert 9a. The second annular insert 9b is disposed, still as shown in FIG. 2, in an axially external position to the second half-ply 4. Finally, at an axially external position to said second annular insert 9b and not necessarily in contact therewith, a further filler 23 is provided which terminates manufacture of the annular reinforcing structure 9.

In an alternative embodiment not shown, the carcass ply has its opposite side edges associated with particular annular reinforcing structures termed bead cores. Association between carcass ply and bead cores is in this case obtained by turning back the opposite side edges of the carcass ply around the bead cores themselves, so as to form the so-called carcass turn-ups.

Circumferentially applied to the carcass structure 2 at a radially external position is a belt structure 5 on which a tread band 6 is circumferentially superposed, on which band 6 longitudinal and transverse recesses are such disposed as to define a desired tread pattern being formed, following a moulding operation carried out concurrently with vulcanisation of the tyre.

Tyre 100 also comprises a pair of sidewalls 7 laterally applied to said carcass structure 2, on opposite sides.

The cross-section profile of tyre 100 has a high transverse curvature. In particular, tyre 100 has a section height H measured in the equatorial plane X-X between the top of the tread band and the fitting diameter, defined by the reference line r, passing through the tyre beads. In addition, tyre 100 has a width C defined by the distance between the laterally opposite ends E of the tread itself, and a curvature defined by the value of the ratio between the distance f of the tread top from the line passing through the ends E of the tread, measured in the equatorial plane of the tyre, and the width C.

Preferably, the tyres of the present invention have a curvature ratio higher than or equal to 0.300. At all events, this curvature ratio f/C is typically lower than 0.800 and preferably lower than 0.500.

The carcass structure 2 is typically coated on its inner walls with an airtight layer 8, a so-called liner, essentially consisting of a layer of elastomeric material impervious to air, adapted to ensure the hermetic tightness of the tyre once inflated.

Preferably, the belt structure 5 comprises at least one layer having a plurality of circumferential coils 5a disposed in axial side by side relationship and formed with a rubberised cord or a strip-like element comprising some rubberised cords (preferably two to five), spirally wound up with a substantially zero-degree angle (typically between 0° and 5°) relative to the equatorial plane X-X of the tyre.

Generally, the cords of the belt structure 5 are textile or metallic cords. Preferably, said cords are made of high-carbon (HT) steel wires, i.e. steel wires having a carbon content greater than 0.9%. When textile cords are used, the latter can be made of synthetic fibre, such as nylon, rayon, PEN, PET, preferably a high-modulus synthetic fibre, in particular an aramid fibre (Kevlar® fibres, for example). Alternatively, hybrid cords can be used, which comprise at least one low-modulus thread i.e. a modulus not exceeding about 15000 N/mm$^2$ (nylon or rayon, for example), interlaced with at least one high-modulus thread (Kevlar®, for example), i.e. a modulus at least as high as 25000 N/mm$^2$.

Optionally, tyre 100 may also comprise a layer 10 of elastomeric material placed between said carcass structure and belt structure 5 formed with said circumferential coils 5a, said layer 10 preferably extending over a surface substantially corresponding to the extension surface of said belt structure 5. Alternatively, said layer 10 extends over a smaller surface than the extension surface of the belt structure 5, only on opposite side portions thereof for example.

In a further embodiment, an additional layer of elastomeric material (not shown in FIG. 2) is placed between said belt structure 5 and tread band 6, said layer preferably extending over a surface substantially corresponding to the extension surface of said belt structure 5. Alternatively, said layer only extends along at least one portion of the extension of the belt structure 5, on opposite side portions thereof, for example.

In a preferred embodiment, at least one of said layer 10 and additional layer comprises short aramid fibres, Kevlar® fibres for example, dispersed in said elastomeric material.

According to an important feature of the invention, a tread pattern is formed on the tread band 6, which pattern comprises a series of transverse grooves disposed at least laterally of the equatorial plane X-X, so that:

the tread pattern on the whole defines a sea/land ratio lower than 14% on the tread band 6;

the series of transverse grooves comprises a plurality of main recesses of an overall length equal to at least one fourth of the lateral extension of the tread band 6;

the main recesses define an angle smaller than or equal to 65° with the equatorial plane X-X, substantially over the whole length thereof.

In other words, "long" recesses, the so-called "main" recesses, are formed on the tread band 6; they have a low inclination relative to the equatorial plane X-X, except for possible portions of non-significant length (smaller than or equal to one eighth of the lateral extension of the tread band, for example).

Preferably, the main recesses define an angle smaller than or equal to 45° with the equatorial plane, in at least one portion of the central region of the tread band 6, i.e. in a region placed astride the equatorial plane X-X and extended over a width equal to 60% of the side extension of the tread band 6.

Figure 3:
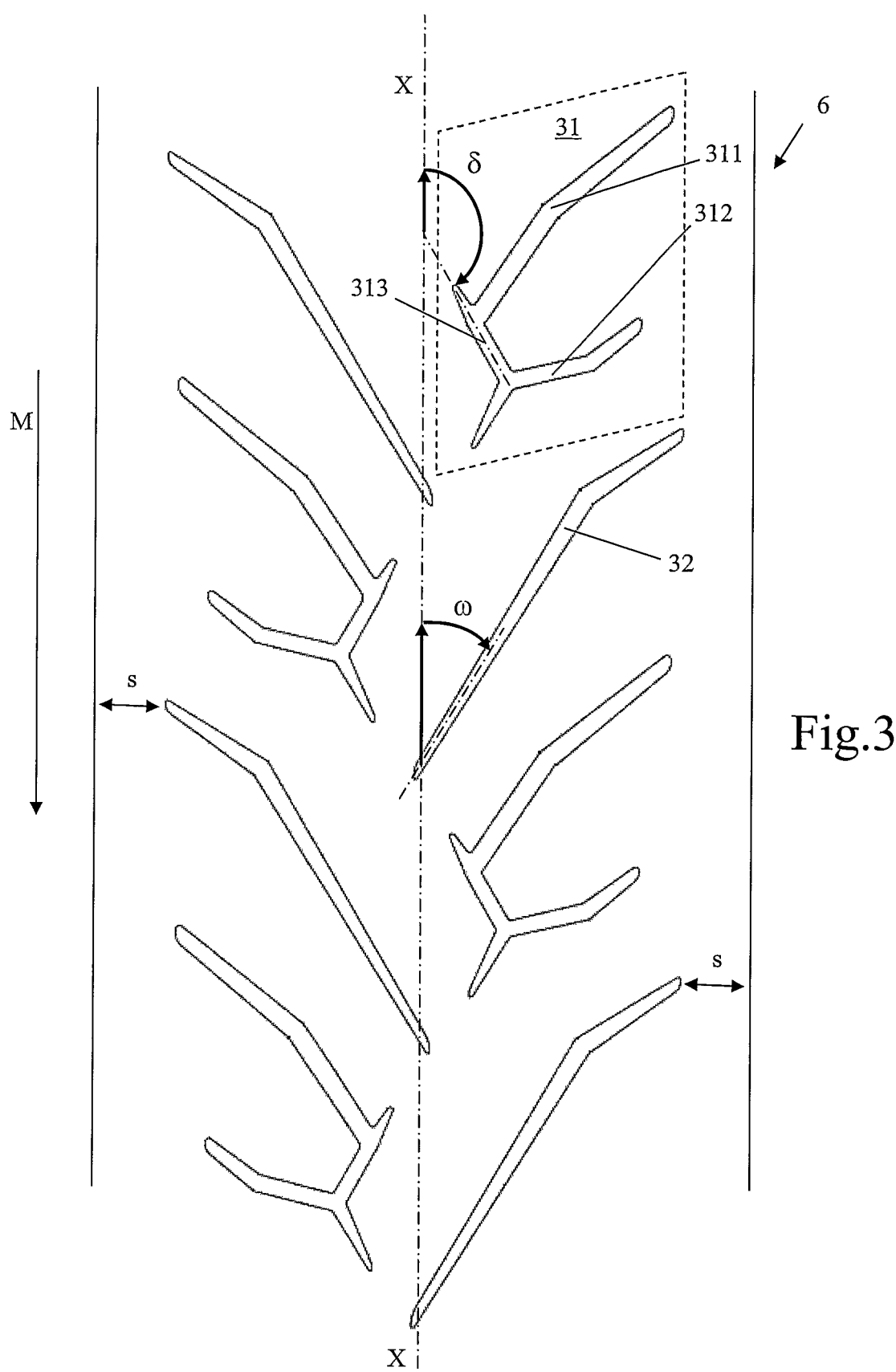
FIG. 3 shows a portion of the circumferential extension of a first example of tread pattern to be applied to a tyre in accordance with the invention, in particular for a tyre to be fitted on the rear wheel of a motorcycle.

FIG. 3 shows a portion of the circumferential extension of a first example of a pattern applicable to a tread band of a tyre according to the invention. The example shown in FIG. 3 is particularly suitable for a tyre to be fitted on the rear wheel of a motorcycle. In FIG. 3, arrow M represents the preferred rotation verse of the tyre, while the dash-dot straight line X-X represents the equatorial plane of the tyre. The tread band 6 is represented in the whole width of its lateral extension.

A tread pattern like the one shown in the example in FIG. 3 on the whole defines a sea/land ratio equal to about 9.0%, on the tread band 6. It will be recognised that in axially more external portions of the tread band, of a width identified as "s" (close to point "E" in FIG. 2), the pattern is without recesses, i.e. it defines a sea/land ratio equal to zero. This choice can be particularly advantageous in the rear tyre, because it allows the surface of the contact region between tyre and ground, when the tyre is run on a bend at the maximum camber angle, to be increased to an important degree, and also a closed tread band ring to be formed, which increases the tread band stiffness above all to shearing stresses (i.e. in the plane of the lateral and longitudinal contact forces). Increase in the surface of the ground-contacting region and increase in the stiffness to shearing stresses can greatly improve the grip of the motorcycle's rear part when the tyre is run on a bend and/or the efficient discharge of the torque to the ground during acceleration at the end of a bend. The width "s", measured on the lateral extension of the tread band, of the axially outermost portions with a zero sea/land ratio can vary from zero to a maximum of about 35 mm. Preferably, a width as large as at least 5 mm is left clear of grooves in the tread band of a tyre suitable for fitting on the rear wheel of a motorcycle, in particular for the Supersport market segment.

The tread pattern shown in FIG. 3 comprises a first group 31 of transverse grooves 311, 312. The transverse grooves 311, 312 are mutually connected by a circumferential groove 313.

The tread pattern shown in FIG. 3 further comprises a second group of transverse grooves 32.

The grooves of the first group 31 and of the second group 32 are circumferentially alternated with each other, on both sides of the equatorial plane X-X. In the axial direction, the grooves of the first group 31 are generally disposed in side by side relationship with the grooves of the second group 32. In the example shown in FIG. 3, the average width of grooves 311, 312, 313, 32 is 5.8 mm.

The transverse grooves 311, 312 of the first group of grooves 31 are formed by a broken line made up of rectilinear stretches connected with each other. In the example shown in FIG. 3, the transverse grooves 32 of the second group too are formed by a broken line made up of rectilinear stretches mutually connected. The term "rectilinear" refers to the fact that the angle relative to the equatorial plane keeps substantially constant over the whole length of the stretches. In the transverse grooves 311, 312, 32 shown in FIG. 3, each rectilinear stretch has an angle ω (for simplicity only shown on one rectilinear stretch of grooves 32 in FIG. 3), different from that of the adjacent stretch, relative to the equatorial plane X-X.

In more detail, with reference to the transverse grooves 311, 312 of the first group 31, they are respectively formed by two and three rectilinear stretches connected with each other.

In grooves 311, a first rectilinear stretch close to the equatorial plane has a smaller angle relative to the angle of a second rectilinear stretch spaced a longer distance from the equatorial plane. In detail, in the example in FIG. 3 the first rectilinear stretch (close to the equatorial plane X-X) of the transverse groove 311 has an angle of about 34° relative to the equatorial plane X-X, while the second rectilinear stretch (far from the equatorial plane X-X) has an angle of about 50° relative to the equatorial plane X-X.

In grooves 312, a first rectilinear stretch close to the equatorial plane has an angle smaller than the angle of a second rectilinear stretch spaced apart a longer distance from the equatorial plane. A third rectilinear stretch connects the first and second rectilinear stretches and has an angle greater than the angle both of the first and the second rectilinear stretches. In detail, in the example in FIG. 3 the first rectilinear stretch (close to the equatorial plane X-X) of the transverse groove 312 has an angle of about 30° relative to the equatorial plane X-X, the second rectilinear stretch (far from the equatorial plane X-X) has an angle of about 52° relative to the equatorial plane X-X, the third rectilinear stretch (intermediate between the first and second ones) has an angle of about 77° relative to the equatorial plane X-X In the first group of grooves 31, the circumferential groove 313 joins the transverse grooves 311, 312 together. More particularly, the transverse groove 311 extends transversely starting from an intermediate portion of the circumferential groove 313. In turn, the circumferential groove 313 extends circumferentially starting from an intermediate portion of the transverse groove 312. The circumferential groove 313 is formed by a rectilinear stretch. In the example in FIG. 3, the circumferential groove 313 has an angle δ of about 150° relative to the equatorial plane X-X.

The transverse grooves of the second group 32 are formed by two mutually connected rectilinear stretches. The first rectilinear stretch, close to the equatorial plane, has a smaller angle than the second rectilinear stretch, spaced apart a longer distance from the equatorial plane. In detail, in the example in FIG. 3 the first rectilinear stretch (close to the equatorial plane X-X) of the transverse grooves 32 has an angle of about 31° relative to the equatorial plane X-X, while the second rectilinear stretch (far from the equatorial plane X-X) has an angle of about 56° relative to the equatorial plane X-X.

The transverse grooves 32 of the second group in addition cross the equatorial plane X-X of the tyre at least at a small end portion.

Generally, given their overall length, the transverse grooves 311, 312, 32 represent main recesses of the tread band 6 and have reduced angles relative to the equatorial plane X-X, in particular in their portions that are the closest to the equatorial plane, i.e. in at least one portion of the central region of the tread band. It should be recognised that the intermediate rectilinear stretch of the transverse groove 312 having an angle of more than 65° relative to the equatorial plane X-X does not by itself represent a main recess of the tread band 6, as its length does not reach one eighth of the lateral extension of the tread band.

Figure 4:
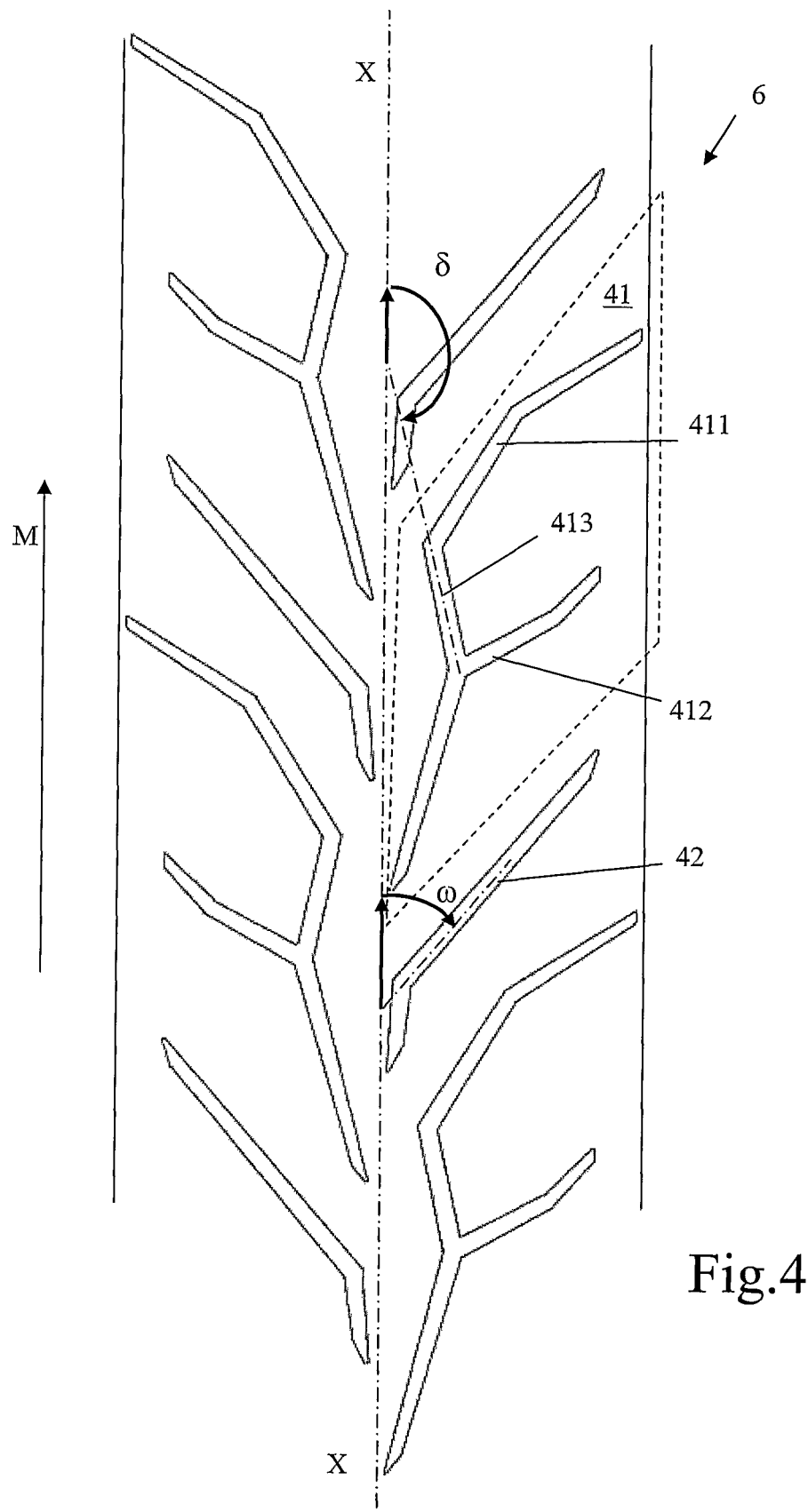
FIG. 4 shows a portion of the circumferential extension of a second example of tread pattern to be applied to a tyre in accordance with the invention, in particular for a tyre to be fitted on the front wheel of a motorcycle.

FIG. 4 shows a portion of the circumferential extension of a second example of a pattern applicable to a tread band of a tyre according to the invention. The example shown in FIG. 4 is particularly suitable for fitting of a tyre on the front wheel of a motorcycle. In FIG. 4, arrow M represents the preferred rotation verse of the tyre, while the dash-dot straight line X-X represents the equatorial plane of the tyre. The tread band 6 is represented in the whole width of its lateral extension.

A tread pattern as in the example shown in FIG. 4, on the whole defines a sea/land ratio equal to about 12.4%, on the tread band 6. As it can be seen, unlike the pattern in FIG. 3, the grooves of the pattern in FIG. 4 substantially extend over the whole lateral extension of the tread band 6.

The tread pattern shown in FIG. 4 comprises a first group 41 of transverse grooves 411, 412. The transverse grooves 411, 412 are mutually connected by a circumferential groove 413.

The tread pattern shown in FIG. 4 further comprises a second group of transverse grooves 42.

The grooves of the first group 41 and of the second group 42 are circumferentially alternated with each other, on both sides of the equatorial plane X-X. In the axial direction, the grooves of the first group 41 are generally disposed in side by side relationship with the grooves of the second group 42. In the example shown in FIG. 4, the average width of grooves 411, 412, 413, 42 is 4.7 mm.

The transverse grooves 411, 412 of the first group of grooves 41 are formed by a broken line made up of rectilinear stretches connected with each other. In the example shown in FIG. 4, the transverse grooves 42 of the second group too are formed by a broken line made up of rectilinear stretches connected with each other. In the transverse grooves 411, 412, 42 shown in FIG. 4, each rectilinear stretch has an angle w (for the sake of simplicity only shown for one rectilinear stretch of grooves 42 in FIG. 4) different from the adjacent stretch, relative to the equatorial plane X-X.

In more detail, with reference to the transverse grooves 411, 412 of the first group 41, they are respectively formed by two and three rectilinear stretches connected with each other.

In grooves 411, a first rectilinear stretch close to the equatorial plane has a smaller angle than that of a second rectilinear stretch spaced apart a longer distance from the equatorial plane. In detail, in the example in FIG. 4 the first rectilinear stretch (close to the equatorial plane X-X) of the transverse groove 411 has an angle of about 32° relative to the equatorial plane X-X, while the second rectilinear stretch (far from the equatorial plane X-X) has an angle of about 57° relative to the equatorial plane X-X.

In grooves 412, a first rectilinear stretch close to the equatorial plane has an angle smaller than that of a second rectilinear stretch spaced apart a longer distance from the equatorial plane. A third rectilinear stretch connects the first and second rectilinear stretches and has an angle greater than both the angles of the first and of the second rectilinear stretches. In detail, in the example in FIG. 4 the first rectilinear stretch (close to the equatorial plane X-X) of the transverse groove 412 has an angle of about 16° relative to the equatorial plane X-X, the second rectilinear stretch (far from the equatorial plane X-X) has an angle of about 44° relative to the equatorial plane X-X, the third rectilinear stretch (intermediate between the first and second stretches) has an angle of about 61° relative to the equatorial plane X-X.

In the first group of grooves 41, the circumferential groove 413 joins the transverse grooves 411, 412 together. More particularly, the transverse groove 411 extends transversely starting from an end of the circumferential groove 413. In turn, the circumferential groove 413 extends circumferentially starting from an intermediate portion of the transverse groove 412. The circumferential groove 413 is formed by a rectilinear stretch. In the example in FIG. 4, the circumferential groove 413 has an angle δ of about 167° relative to the equatorial plane X-X.

The transverse grooves of the second group 42 are formed by two rectilinear stretches connected with each other. The first rectilinear stretch close to the equatorial plane, has a smaller angle than that of the second rectilinear stretch, spaced apart a greater distance from the equatorial plane. In detail, in the example in FIG. 4 the first rectilinear stretch (close to the equatorial plane X-X) of the transverse grooves 42 has an angle of about 6° relative to the equatorial plane X-X, while the second rectilinear stretch (far from the equatorial plane X-X) has an angle of about 41° relative to the equatorial plane X-X.

None of the grooves of the tread pattern in FIG. 4 crosses the equatorial plane X-X. This choice is particularly advantageous for a tyre to be fitted on the front wheel of a motorcycle, to increase the stability behaviour of same when the tyre is rolling on a straight line at high speeds, due to an increase in the stiffness to shearing stresses of the closed ring being formed, thereby reducing the perturbations to the motorcycle's handlebar.

Generally, given their overall length, the transverse grooves 411, 412, 42 represent main recesses of the tread band 6 and have reduced angles relative to the equatorial plane X-X, in particular in their portions that are the closest to the equatorial plane, i.e. in at least one portion of the central region of the tread band.

Figure 5:
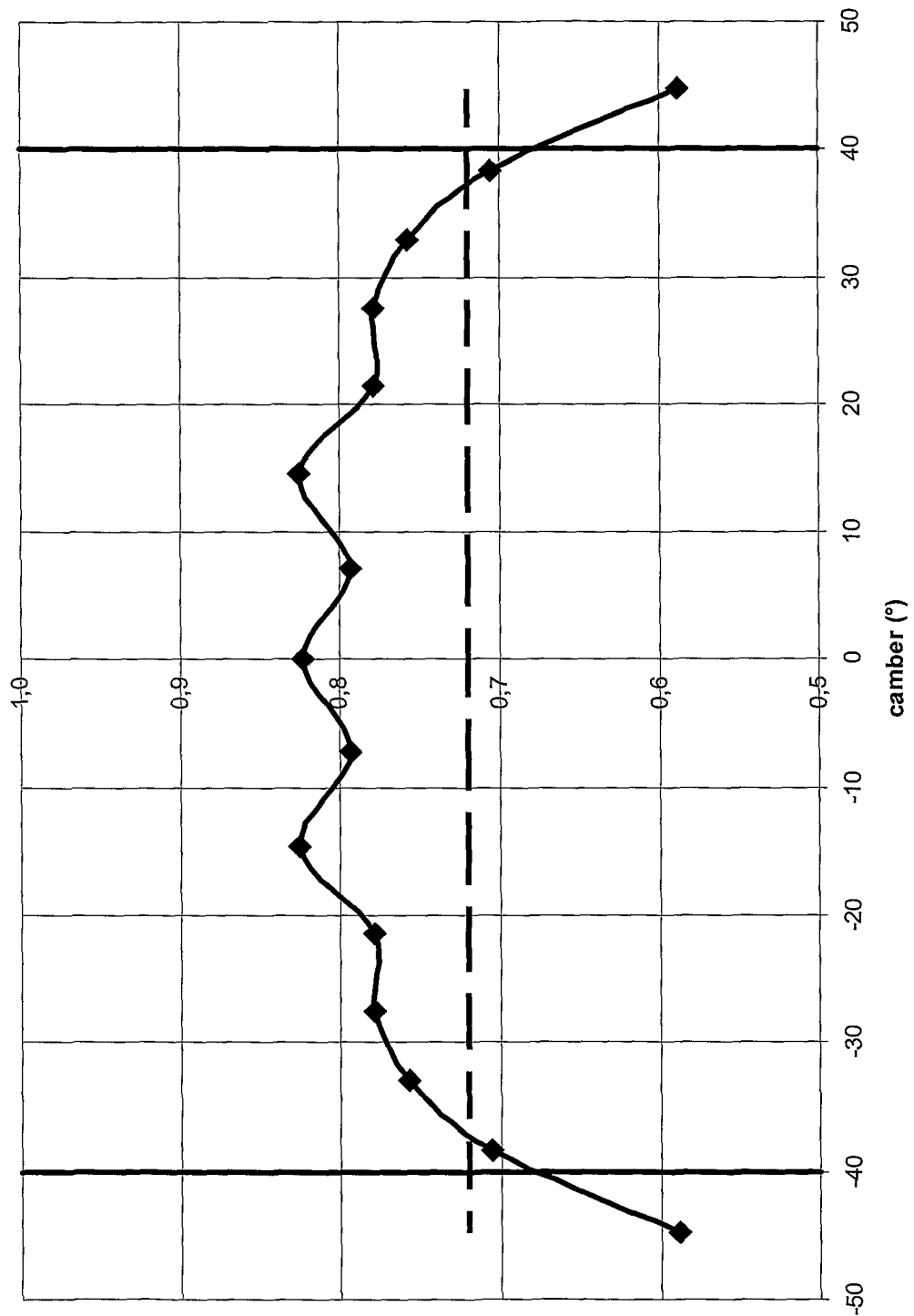
FIG. 5 shows the variations in the sea/land ratio of a tyre comprising a tread band having a pattern according to the example in FIG. 3.

FIG. 5 shows the variation of the sea/land ratio, referred to a typical footprint width to static loads (about 150 kg), defined by the tread pattern in FIG. 3. In particular, reproduced in the x-axis is the sea/land ratio defined by the tread pattern in FIG. 3 (invention) divided by the sea/land ratio defined by the tread pattern in FIG. 1a (comparison). Reproduced in the y-axis is the camber angle, i.e. a co-ordinate along the whole lateral extension of the tread band.

Figure 1:
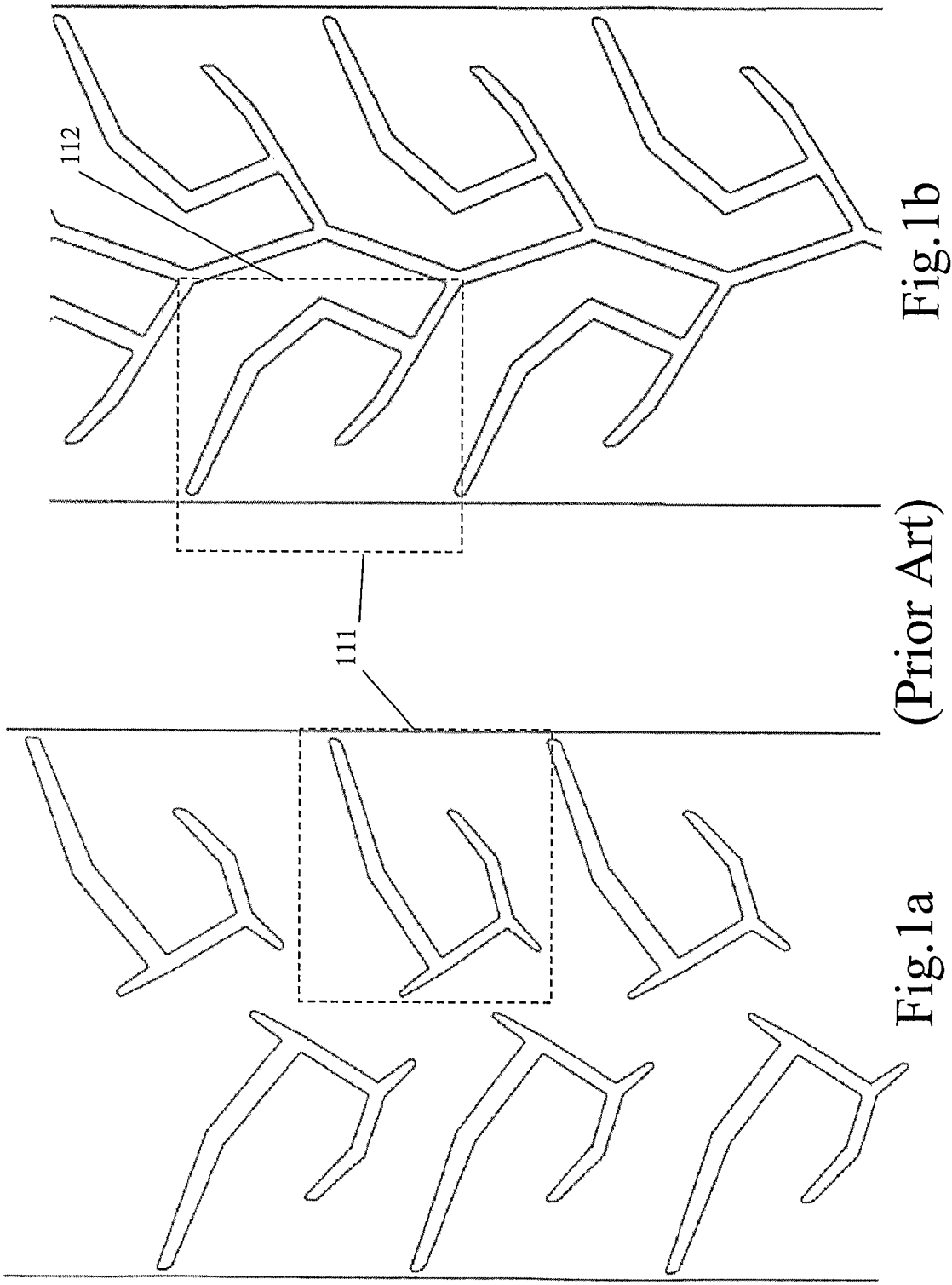
FIGS. 1a and 1b show a portion of the circumferential extension of the tread of a rear tyre and a front tyre respectively, known in the art, as described above.

The dashed line in FIG. 5 shows the sea/land ratio defined by the tread pattern in FIG. 3 as a whole, which appears to be lower than the corresponding sea/land ratio defined by the pattern in FIG. 1a (their ratio is lower than 1). On the whole, the tread pattern in FIG. 3 therefore has a smaller number of grooves as compared with the tread pattern in FIG. 1a.

The solid line in FIG. 5 shows the variations in the average sea/land ratio defined by the pattern in FIG. 3 on circumferential portions of a tread band of a 60 mm width (representative of the width of the contact footprint on the rear tyre for static loads). It will be recognised that the reduction in the sea/land ratio in the tread pattern of FIG. 3 relative to the tread pattern of FIG. 1a is maintained over the whole lateral extension of the tread band (ratio always lower than 1). In the central region of the tread band however there is a higher sea/land ratio than in the shoulder regions. In particular, for particularly high camber angles (beyond 40°), there is an important reduction in the sea/land ratio in the tread pattern of FIG. 3.

Figure 6:
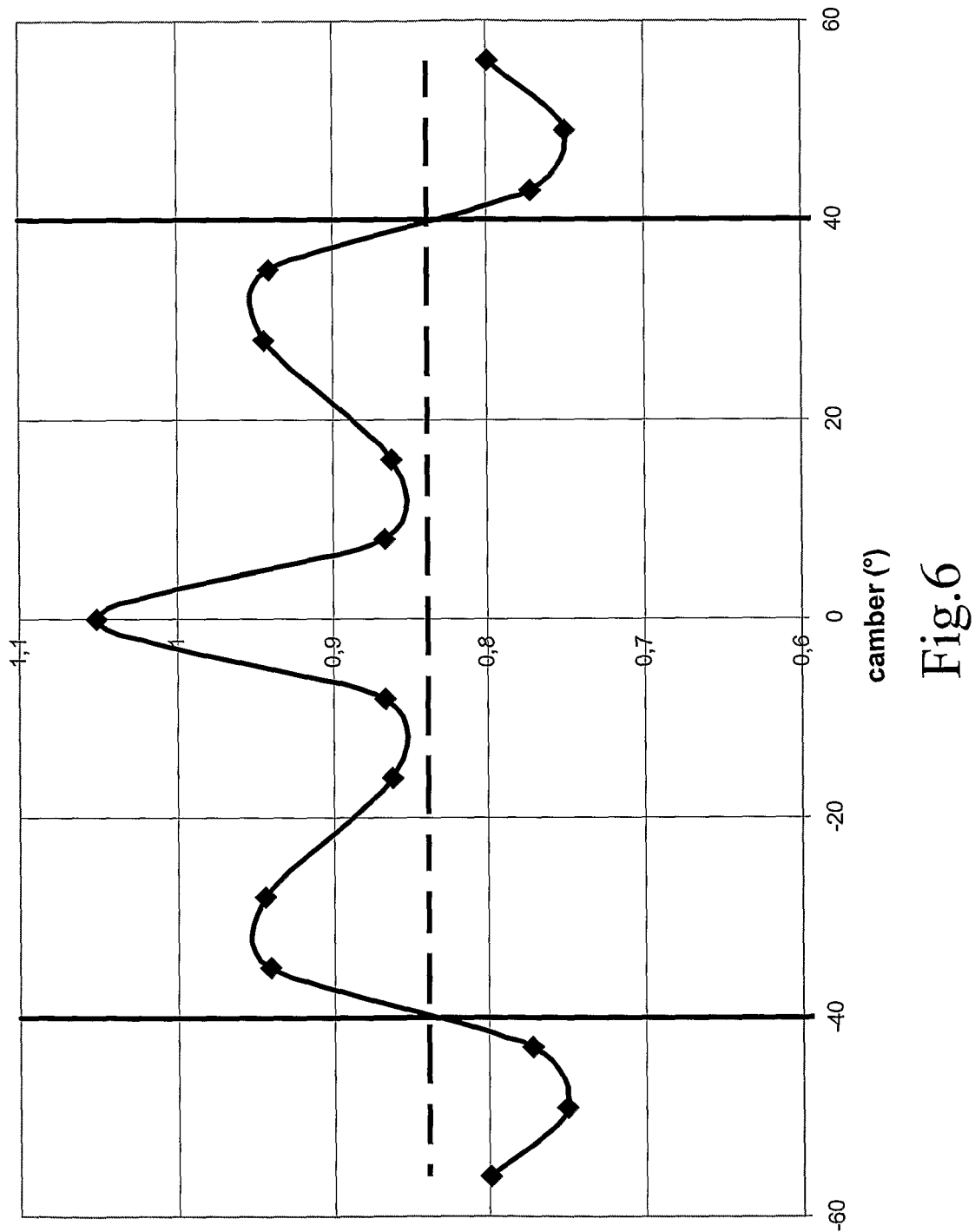
FIG. 6 shows the variations in the sea/land ratio of a tyre comprising a tread band with a pattern according to the example in FIG. 4.

FIG. 6 shows the variations in the sea/land ratio referred to a typical footprint width to static loads (about 150 kg), defined by the tread pattern in FIG. 4. In particular, reproduced in the x-axis is the sea/land ratio defined by the tread pattern in FIG. 4 (invention) divided by the sea/land ratio defined by the tread pattern in FIG. 1b (comparison). Reproduced in the y-axis is the camber angle, i.e. a co-ordinate along all the lateral extension of the tread band.

The dashed line in FIG. 6 shows the sea/land ratio defined by the tread pattern in FIG. 4 as a whole, which appears to be lower than the corresponding sea/land ratio defined by the pattern in FIG. 1b (their ratio is lower than 1). On the whole, the tread pattern in FIG. 4 therefore has a smaller number of grooves than the tread pattern in FIG. 1b.

The solid line in FIG. 6 shows the variations in the average sea/land ratio defined by the pattern in FIG. 4 on circumferential portions of a tread band of a 40 mm width (representative of the contact footprint on the front tyre for static loads). As it can be seen, the reduction in the sea/land ratio of the tread pattern in FIG. 4 as compared with the tread pattern in FIG. 1b is maintained over the whole lateral extension of the tread band (ratio always lower than 1), except for the region astride the equatorial plane where, in spite of the absence of a continuous circumferential groove as in FIG. 1b, the tread pattern of FIG. 4 has a higher sea/land ratio. In this case too, in the central region of the tread band there is a higher sea/land ratio as compared with the shoulder regions. In particular, for particularly high camber angles (beyond 40°) there is a great reduction in the sea/land ratio.

The following Table 1 shows the results obtained from an example of a tyre in accordance with the invention, size 190/50 ZR 17 for use on the rear wheel of a motorcycle (Yamaha YZF, Suzuki GSX 1000) comprising a tread band with a pattern as the one shown in the preceding FIG. 3. The results of Table 1 were assessed considering a reference value equal to 100 for a comparison tyre Diablo™ model of same size and same carcass/belt structure, comprising a tread band with a pattern as the one seen in FIG. 1a.

The tyre of the example in accordance with the invention had a curvature ratio of 0.309, while the comparison tyre had a curvature ratio of 0.293.

In addition, for the tread band of the tyre in the example according to the invention a compound softer than that used in the tread band of the comparison tyre was used, with a tan δ value greatly higher and modulus of elasticity of lower value at high temperature (70°).

In Table 1 the assessments obtained from the tyre of the invention as compared with the comparison tyre have been reproduced for four parameters: stability in acceleration on leaving a bend, behaviour on a wet ground, grip on a dry ground, behaviour on a bend at the maximum camber angle (maximum inclination). For each of the four parameters, it was assessed the contribution given by the carcass/belt structure, the curvature profile, the tread pattern and the blend of the tyre. The column "Total amount" represents the product of the different contributions (expressed in percent).

TABLE 1

|  | Structure | Profile | Pattern | Blend | Total amount |
|---|---|---|---|---|---|
| Stability on leaving a bend | 100 | 105 | 110 | 95 | 110 |
| Behaviour on a wet ground | 100 | 100 | 95 | 120 | 114 |
| Grip on a dry ground | 100 | 100 | 105 | 110 | 116 |
| Behaviour with maximum inclination | 100 | 105 | 105 | 105 | 116 |

The tyre of the invention has a better overall behaviour than the comparison tyre as regards all assessed features. It will be appreciated that the contribution given by the tread pattern appears to be very important for the tyre behaviour on a bend, both in acceleration on leaving the bend itself and when the running tyre reaches its maximum inclination. In particular, thanks to the contribution given by the tread pattern it is possible to efficiently compensate for a stability reduction in acceleration on leaving a bend, which reduction is due to the increased softness of the compound. On the other hand, use of a softer compound allows counteracting the behaviour on a wet ground of the tread pattern of the tyre according to the invention, which is by itself less efficient, said less efficient behaviour being due to a lower sea/land ratio which, on the other hand, is advantageous for the tyre behaviour on a dry road surface.

Figure 7C:
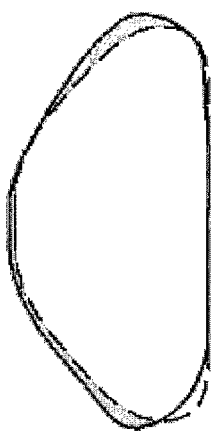
FIGS. 7a, 7b, 7c respectively show the footprint area obtainable at a camber angle of 45° by a tyre having a tread pattern according to the example in FIG. 1a (known art) and the example in FIG. 3 (invention), and a comparison between the two footprint areas.
Figure 7B:
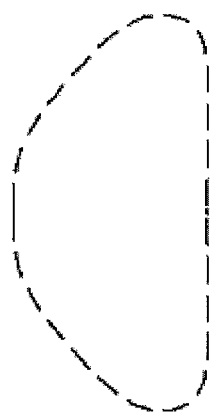
Figure 7A:
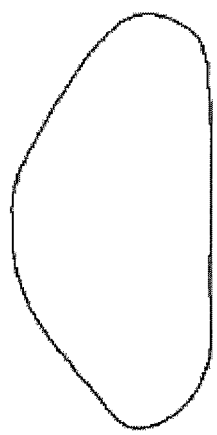

FIGS. 7a and 7b show the footprint areas obtained with a camber angle of 45° for the tyre of the invention and the comparison tyre, respectively. FIG. 7c shows a comparison between the two footprint areas. It will be recognised that the footprint area obtained by the tyre of the invention is longer and has a greater surface than that of the comparison tyre, which is advantageous for the tyre grip to the maximum inclination of the wheel and for stability in acceleration on leaving a bend.

The present invention has been described with reference to some embodiments thereof. Different modifications can be made to the embodiments described in detail, without however departing from the protection scope of the invention as defined in the appended claims. For instance, in the tread pattern it is possible to use curvilinear grooves instead of grooves formed with a broken line made up of mutually connected rectilinear stretches.

The invention claimed is:

1. A tyre for motorcycles comprising a tread band having a central region and two shoulder regions, said central region extending symmetrically astride an equatorial plane of said tyre over a width less than or equal to 60% of a lateral extension of the tread band, and a tread pattern comprising a series of transverse grooves disposed at least laterally of said equatorial plane being formed on said tread band, wherein:
said series of transverse grooves comprises a plurality of main recesses having an overall length equal to at least one fourth of a lateral extension of said tread band;
said main recesses define, with said equatorial plane, an angle less than or equal to 65°, substantially over the entire length thereof; and
a series of circumferential grooves,
wherein said circumferential grooves form an angle of at least 135° with said equatorial plane,
wherein said series of transverse grooves comprises a first group of transverse grooves, in which pairs of transverse grooves are mutually connected by one of said circumferential grooves, and a second group of isolated transverse grooves,
wherein said tread pattern defines a sea/land ratio less than 10% on said tread band, and said tyre is capable of being fitted on a rear wheel of a motorcycle, and
wherein at least some transverse grooves intersect said equatorial plane.

2. The tyre for motorcycles as claimed in claim 1, wherein said main recesses define an angle less than or equal to 45° with said equatorial plane, in at least one portion of the central region of said tread band.

3. The tyre for motorcycles as claimed in claim 1, wherein a transverse profile of said tread band has a curvature ratio greater than or equal to 0.300.

4. The tyre for motorcycles as claimed in claim 1, wherein said sea/land ratio is higher in said central region than in said shoulder regions of the tread band.

5. The tyre for motorcycles as claimed in claim 1, comprising a carcass structure and a belt structure at a radially external position to said carcass structure, said tread band being disposed at a radially external position to said belt structure.

6. The tyre for motorcycles as claimed in claim 5, wherein said carcass structure comprises at least one layer of elastomeric material comprising reinforcing elements substantially disposed in a direction perpendicular to a circumferential direction of the tyre.

7. The tyre for motorcycles as claimed in claim 5, wherein said belt structure comprises at least one layer of elastomeric material comprising reinforcing elements substantially disposed in a circumferential direction.

8. The tyre for motorcycles as claimed in claim 1, wherein said tread pattern defines a sea/land ratio exceeding 4% on said tread band.

9. The tyre for motorcycles as claimed in claim 1, wherein said transverse grooves are formed by a broken line comprising mutually-connected rectilinear stretches.

10. The tyre for motorcycles as claimed in claim 1, wherein said first group and second group of transverse grooves are alternated with each other in said tread pattern.

11. The tyre for motorcycles as claimed in claim 1, wherein at least one axially external portion of said shoulder regions has a sea/land ratio equal to zero.

12. The tyre for motorcycles as claimed in claim 1, wherein said main recesses have an average width less than or equal to about 6 mm.

13. The tyre for motorcycles as claimed in claim 1, wherein said main recesses have an average width less than or equal to about 5 mm.

14. A motorcycle comprising a front wheel and a rear wheel, the rear wheel comprising a tyre as claimed in claim 1, fitted thereon.

15. The motorcycle as claimed in claim p, wherein:
said front wheel comprises a front tyre, wherein a tread pattern of said front tyre defines a sea/land ratio higher than 10% on a tread band of said front tyre; or wherein main recesses of said front tyre have an average width less than or equal to about 5 mm; or wherein at least one portion of a central region of said front tyre placed at an equatorial plane of said front tyre has a sea/land ratio equal to zero; and
wherein at least one axially external portion of said shoulder regions of said tyre of said rear wheel has a sea/land ratio equal to zero; or wherein said main recesses of said tyre of said rear wheel have an average width less than or equal to about 6 mm.

* * * * *